(12) United States Patent
Ferraz, Jr. et al.

(10) Patent No.: US 12,286,982 B1
(45) Date of Patent: Apr. 29, 2025

(54) MODULAR HYDRAULIC MANIFOLD

(71) Applicant: Caterpillar Inc., Peoria, IL (US)

(72) Inventors: John Ferraz, Jr., Itasca, IL (US);
William O'Neill, Eureka, IL (US);
Michael Thomas Jackson, Hanna, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/385,379

(22) Filed: Oct. 30, 2023

(51) Int. Cl.
| | | |
|---|---|---|
| *F15B 13/04* | (2006.01) | |
| *F15B 13/02* | (2006.01) | |
| *F16K 11/07* | (2006.01) | |
| *F16K 27/04* | (2006.01) | |

(52) U.S. Cl.
CPC ........ *F15B 13/0402* (2013.01); *F15B 13/024* (2013.01); *F16K 11/0716* (2013.01); *F16K 27/041* (2013.01)

(58) Field of Classification Search
CPC ...... F15B 13/0402; E02F 3/84; F16K 27/041; F16K 11/0716
See application file for complete search history.

(56) References Cited

U.S. PATENT DOCUMENTS

| | | |
|---|---|---|
| 7,499,783 B2 | 3/2009 | Oka |
| 9,631,644 B2 | 4/2017 | Huang et al. |
| 10,662,619 B2 | 5/2020 | Sakamoto |
| 10,858,806 B2 | 12/2020 | Ferraz, Jr. et al. |
| 11,209,028 B2 | 12/2021 | Yuan |
| 2010/0101662 A1 | 4/2010 | Büttner et al. |
| 2017/0328380 A1 | 11/2017 | Coolidge et al. |
| 2018/0224014 A1* | 8/2018 | Colletti ............... F16K 31/0613 |
| 2019/0264714 A1 | 8/2019 | Gagne |
| 2019/0323389 A1* | 10/2019 | Mitsutani ................ F15B 15/12 |
| 2020/0088218 A1* | 3/2020 | Vermande ........... F16K 37/0041 |
| 2020/0283995 A1 | 9/2020 | Ferraz, Jr. et al. |
| 2020/0291611 A1 | 9/2020 | Ferraz, Jr. et al. |
| 2022/0206517 A1 | 6/2022 | Ma et al. |

FOREIGN PATENT DOCUMENTS

| | | |
|---|---|---|
| DE | 102004024671 A1 | 12/2005 |
| JP | 3659549 | 6/2005 |
| KR | 101809841 | 12/2017 |

OTHER PUBLICATIONS

Written Opinion and International Search Report for Int'l. Patent Appln. No. PCT/US2024/048157, mailed Dec. 10, 2024 (22 pgs).

* cited by examiner

*Primary Examiner* — Kelsey E Cary
(74) *Attorney, Agent, or Firm* — Lee & Hayes, P.C.

(57) ABSTRACT

This disclosure describes a modular hydraulic manifold for controlling an operation of a hydraulic actuator for an earthmoving machine. The manifold has a spool chamber and a load sensing passageway. The body also has a spool positioned axially within the spool chamber. The spool is spring-biased by an end cap. The module also has a pair of spool actuators that are located at a second end of the body and operable to axially displace the spool within the spool chamber. The pair of spool actuators are positioned in parallel and disposed adjacent to one another. The manifold also has an inlet chamber disposed parallel to the spool chamber and in selective fluid communication with the spool chamber via a spool supply passageway. The body includes openings on opposite sides that open directly to inlet and spool chambers of adjacent bodies to reduce passageway constriction within the hydraulic system.

20 Claims, 5 Drawing Sheets

MODULAR HYDRAULIC MANIFOLD

TECHNICAL FIELD

The present disclosure relates to a control module for controlling operation of a hydraulic actuator associated with an earthmoving machine. More particularly, the present disclosure relates to a modular hydraulic manifold having at least two control modules for controlling operation of at least two hydraulic actuators of an earthmoving machine.

BACKGROUND

Earthmoving machines typically employ several hydraulic actuators for actuating movement of one or more work implements therein. One example of such an earthmoving machine may include a track-type tractor having a dozing blade and a ripper as the work implements mounted thereon. Such machines may also employ a manifold to help provide a multi-function displacement control, in more than one axis of lever movement by the operator, to move each of the hydraulic actuators for modulating a positioning of the work implements in operation.

An example of such a system is disclosed in U.S. Pat. No. 9,631,644. However, system hardware design of conventional manifold systems, including the system of the '644 patent, may be bulky in construction owing, at least in part, to a sub-optimal positioning of valves and actuators that are used to form the manifold besides continuing to require an increased amount of plumbing for achieving the desired functionality. Additionally, heat generation due to throttling within the manifold and bends/turns within the manifold and attached connectors can result in overheating of hydraulic components and breakdown of fluid and/or components. Consequently, manufacture of such conventional systems may be expensive and must be monitored or maintained to reduce heat buildup. Further, an increased amount of space may be required on the machine for installing and operating such conventional systems.

Examples of the present disclosure are directed toward overcoming the deficiencies described above.

SUMMARY

One general aspect includes a control module for a hydraulic actuator. The control module includes a body having a length, a width, and a height and defines a spool chamber extending at least partially along the length of the body along a first axis and coupled to a spring at a first end of the body, a load sensing passage associated with the spool chamber and extending at least partially along the length of the body parallel with the first axis, a first outlet port on a first surface of the body in selective fluid communication with the spool chamber, a second outlet port on the first surface of the body in selective fluid communication with the spool chamber; an inlet chamber positioned parallel with the spool chamber and in fluid communication with the spool chamber via a spool supply passage. The body also defines a first side port on a second surface of the body, the first side port in fluid communication with the spool chamber and disposed along the first axis of the spool chamber, where the second surface is perpendicular to the first surface and a second side port on the second surface of the body, the second side port in fluid communication with the spool chamber and disposed along the first axis of the spool chamber. The body also defines a third side port on a third surface of the body, the third side port in fluid communication with the spool chamber and disposed along the first axis of the spool chamber, where the third surface is perpendicular with the first surface and parallel with the second surface and a fourth side port on the third surface of the body, the fourth side port in fluid communication with the spool chamber and disposed along the first axis of the spool chamber. The control module also includes a spool positioned axially within the spool chamber. The module also includes a pair of spool actuators located at a second end of the body, the spool actuators are operable to displace the spool within the spool chamber.

In some examples, the control module where the spool chamber may include a float chamber, the float chamber positioned at an intersection between a connection from the inlet chamber to the spool chamber. The spool may include a movable float, the movable float positionable along a length of the spool. The control signal channel may include a first angled hole from the control signal channel to the spool chamber at a first location and a second angled hole from the control signal channel to the spool chamber at a second location. The body may include an iron casting having a weight of greater than 12.5 kilograms. The first side port, second side port, third side port, and fourth side port each define a respective open area to provide fluid communication to an adjacent control module, the respective open area having a cross-sectional area of greater than 550 square millimeters. The control module may include a signal port fluidly coupling the inlet chamber and the spool chamber, the signal port being disposed at a non-perpendicular angle relative to the first axis. The control module may include a first relief valve in fluid communication with the first side port and the first outlet; and a second relief valve in fluid communication with the second side port and the second outlet.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Wherever possible, the same reference numbers will be used throughout the drawings to refer to the same or like parts.

Figure 1:
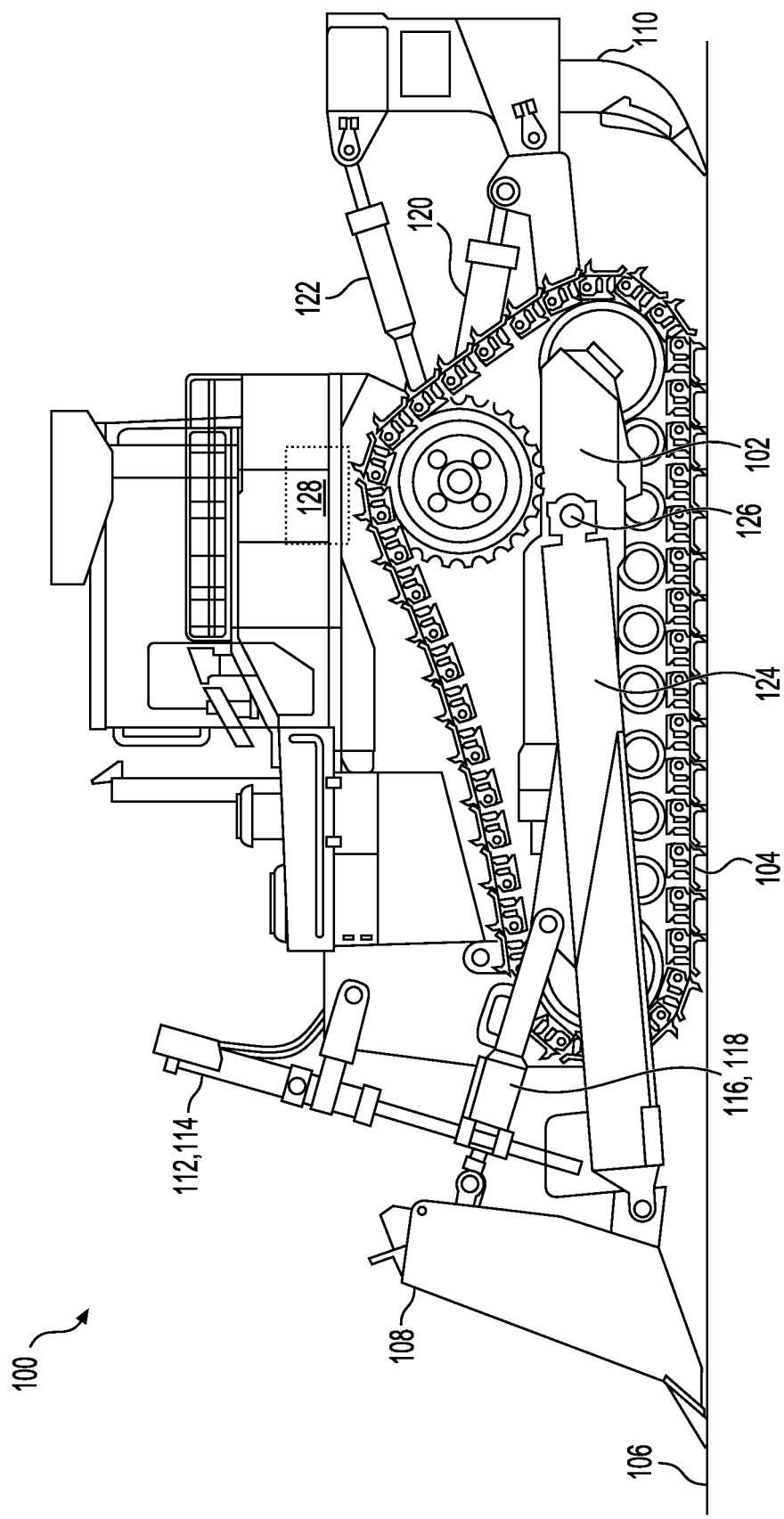
FIG. 1 illustrates an exemplary earthmoving machine having hydraulic actuators for controlling movement of work implements, according to at least one example.

FIG. 1 illustrates an exemplary earthmoving machine 100, hereinafter referred to as 'the machine 100'. As shown, the machine 100 is embodied as a tractor. However, in other embodiments, the machine 100 may embody other forms or types of earthmoving machines known to persons skilled in the art.

The machine 100 includes a frame 102, and a pair of ground engaging members 104 rotatably supported on the frame 102. Although, only one ground engaging member 104 is visible in the side view of FIG. 1, a similar ground engaging member is present on the machine 100 and is located distally away from the ground engaging member 104 visible in the view of FIG. 1. The ground engaging members 104 may rotate relative to the frame 102 for propelling the machine 100 on a work surface 106, for example, a mine site. As shown, the pair of ground engaging members 104 may include tracks. However, persons skilled in the art will acknowledge that the present disclosure is not limited to a type of ground engaging members 104 i.e., the tracks disclosed herein. Other types of ground engaging members, for example, wheels may be used to form the ground engaging members 104 in lieu of the tracks disclosed herein.

The machine 100 may include a first work implement 108 that is moveably supported on a fore portion of the frame 102. As shown, one end of a push arm 124 is coupled to the frame 102 using a pivot joint 126 and another end of the push arm 124 pivotally supports movement of the work implement 108 thereon. Further, as shown in the view of FIG. 1, the first work implement 108 is embodied as a carry-dozing blade, and for sake of simplicity, the first work implement 108 will hereinafter be referred to as 'the blade 108'.

With continued reference to FIG. 1, the machine 100 includes a pair of hydraulic lift actuators 112, 114 hereinafter referred to as 'the lift actuator/s 112, 114', that are supported by the frame 102 and connected to a rearwardly facing mid-portion of the first work implement 108. The lift actuators 112, 114 operably raise or lower the first work implement 108 in relation to the work surface 106. Further, the machine 100 also includes a pair of hydraulic tilt actuators 116, 118, hereinafter referred to as 'tilt actuator/s 116, 118', that are disposed on opposite sides of the machine 100 and located between the push arms 124 and the blade (e.g., first work implement 108) for tilting and/or tipping the first work implement 108 relative to the frame 102.

Additionally, or optionally, as shown, the machine 100 further includes another work implement i.e., a second work implement 110 moveably supported on a rear portion of the frame 102. As shown in the illustrated embodiment of FIG. 1, the second work implement 110 is embodied as a ripper, and for sake of convenience, the second work implement 110 will hereinafter be referred to as 'the ripper 110'. Furthermore, the machine 100 also includes a pair of ripper lift actuators 120 and a pair of ripper tilt actuators 122, each of which are disposed on opposite sides of the machine 100 and supported by the frame 102. The ripper lift actuators 120 are configured to operably lift i.e., raise or lower the second work implement 110 relative to the frame 102, or stated differently, relative to the work surface 106. The ripper tilt actuators 122 are configured to operably change an angle of attack of the second work implement 110 relative to the work surface 106, or stated differently, change an axis of the second work implement 110 relative to the frame 102.

In this application, 'tilting' of the first work implement 108 is the action of moving the first work implement 108 about a horizontally arranged longitudinal axis that is substantially perpendicular to the first work implement 108, whereas 'tipping' of the first work implement 108 is the action of moving the first work implement 108 about a horizontally arranged transverse axis that is substantially parallel to the first work implement 108. However, in the context of the second work implement 110 (e.g., a ripper), the terms 'tilt' and 'lift' are representative of an angular orientation and a height of the second work implement 110 respectively with respect to the frame 102 of the machine 100 or the work surface 106. Moreover, although one configuration of the lift actuators 112, 114, the tilt actuators 116, 118, and the ripper lift and tilt actuators 120, 122 is disclosed herein, persons skilled in the art will acknowledge that embodiments of the present disclosure may be similarly applied to other types of machines in which alternative configurations of the lift actuators 112, 114, the tilt actuators 116, 118, and/or the ripper lift and tilt actuators 120, 122 may be contemplated for use in controlling movement of one or more work implements relative to the frame 102.

In addition to the aforementioned functions, advanced functionality may be associated with one or both work implements 108, 110, for instance, the first work implement 108. The present disclosure discloses, in part, specific hydraulic control hardware design that can operationally support fluid delivery demands by one or more actuators, for example, during a typical regeneration event in which quicker movement of lift and/or tilt hydraulic actuators may be needed, or when the first work implement 108 is required to be set into a float condition in which the first work implement 108 is subject to the influence of gravity alone and due to which the first work implement 108, loaded or without load thereon, would typically come to rest on the work surface 106. Therefore, it will be appreciated that the specific hydraulic control hardware disclosed herein is intended to support these, amongst other advanced functionality of the work implements 108, 110 that are commonly known to persons skilled in the art.

Figure 2:
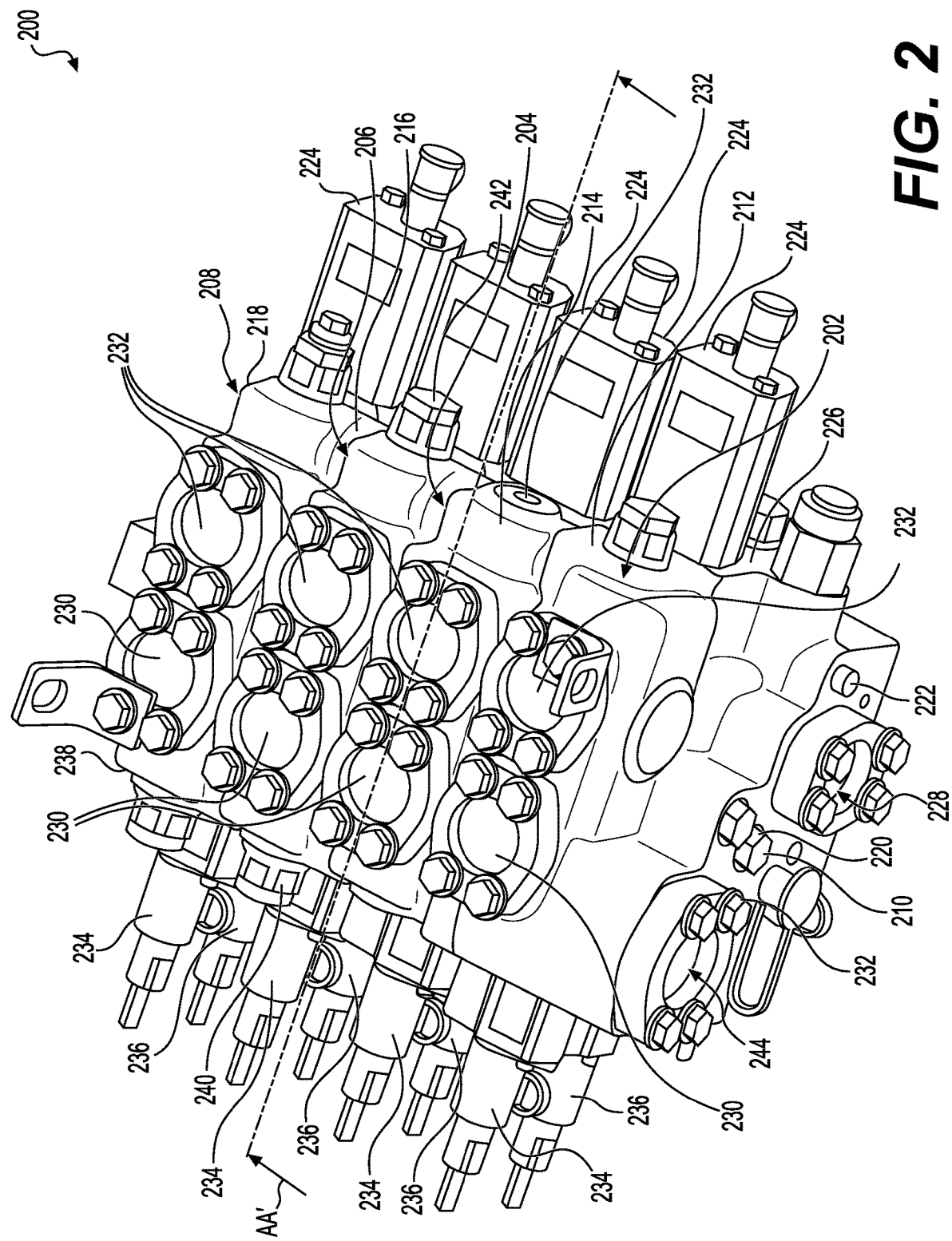
FIG. 2 illustrates a modular hydraulic manifold showing four control modules that are setup for controlling movement of hydraulic actuators of a system or machine, such as the earthmoving machine of FIG. 1, according to at least one example.
Figure 3:
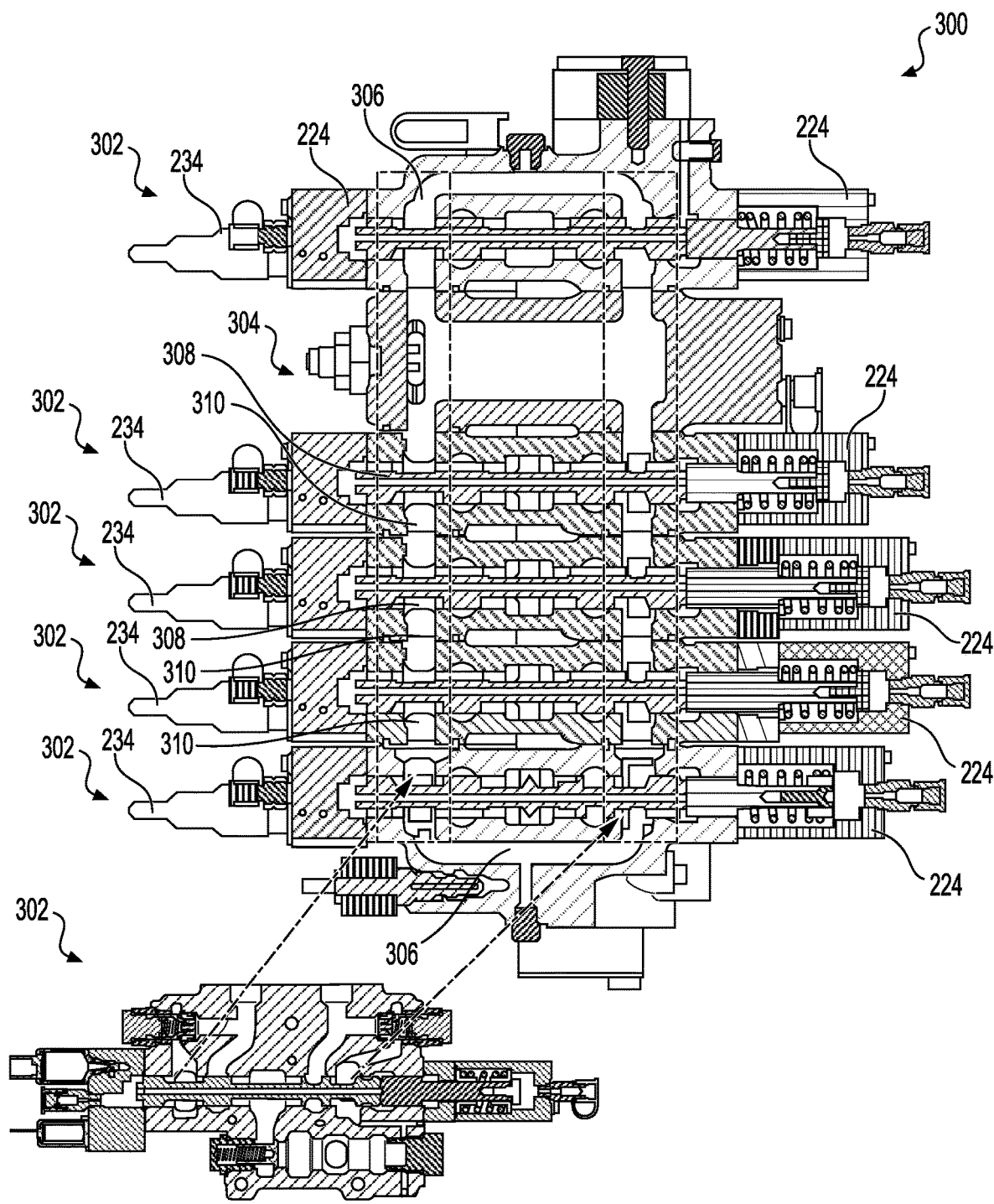
FIG. 3 illustrates a cross-sectional view of a modular hydraulic manifold including five control modules and showing connecting fluid circuits, according to at least one example.

A modular manifold 128 is provided to the machine 100 and is shown schematically in FIG. 2 or 3, in accordance with examples of the present disclosure. In such examples, the modular manifold 128 may include four control modules that correspond to the eight hydraulic actuators 112-122 of the machine 100. The control modules may be configured to control operation of the lift actuators 112, 114, the tilt actuators 116, 118, the ripper lift actuators 120, and the ripper tilt actuators 122 respectively.

The modular manifold 128 as described herein is designed to overcome overheating on machine applications that involve high continuous use of an implement. The conventional manifold may overheat under such conditions but the modular manifold 128 described herein results in reduction in overheating. In conventional manifolds, operating at excessive oil temperature levels results in a dramatic reduction in hydraulic component life. The modular manifold 128 may contributes as high as 29.5 kW of heat generation within the hydraulic system.

In the modular manifold 128, an internal passageway of the modular manifold 128 is enlarged, reshaped, and relocated to reduce heat generation. The inlet chamber, intermediate chambers, and spool supply passageway are additionally modified over conventional manifold designs. For example, the load check-valve increases in diameter. Further, the outlet ports are enlarged significantly to enable transition of fluid between modules without excess heat generation. Further, the ports are repositioned within the manifold body to improve the fluid communication as it goes through from one control module through a second, third, or additional control module until it exits the control module group (to the tank). The modified features of the modular manifold 128 result in up to a 25% improvement in reducing heat generation from the control module group.

The modular manifold 128 is a high flow manifold for controlling operation of hydraulic actuators, such as actuators 112-122 with reduced heat generation performance.

FIG. 2 illustrates a modular hydraulic manifold 200 showing four control modules that are setup for controlling movement of hydraulic actuators of a system or machine, such as the earthmoving machine of FIG. 1, according to at least one example. The modular manifold 200 includes four control modules 202, 204, 206 and 208 that correspond to the eight hydraulic actuators 112-122 of the machine 100. The control modules 202, 204, 206, and 208 are configured to control operation of the lift actuators 112, 114, the tilt actuators 116, 118, the ripper lift actuators 120, and the ripper tilt actuators 122 respectively.

In embodiments herein, the control modules 202, 204, 206, and 208 are successively located adjacent to one another. Further, bodies of the individual control modules 202, 204, 206, and 208 are releasably secured using one or more fasteners (not shown), for example, HEX bolts received, with or without fluid scaling mechanisms, within one or more mounting through-holes defined on the bodies 212-218 of the control modules 202, 204, 206, and 208. Plugs 210 and 220 are provided that control access to the control signal passages (e.g., control signal passage 530). Furthermore, upon securement, the adjacently located control modules 202, 204, 206, and 208 are coupled in fluid communication with one another, via mutually aligned ports as will be explained later herein, to facilitate a sharing of fluid flow between the individual control modules 202, 204, 206 and 208 with each control module 202, 204, 206, and 208 present in the manifold 200 being adapted to deliver fluid with optimally specific pressure/s based on application requirements, for instance, the dynamically changing load conditions on the actuators associated with the work implements 108, 110, or in other words, the dynamically changing hydraulic load on a fluid transmission system (not shown) of the machine 100, for example, a variable displacement pump and/or other hydraulic circuits of the machine 100 that may be coupled in communication with the manifold 200. These adaptations may be specific to individual control modules 202, 204, 206, and 208 respectively, as will be explained later herein. However, it is to be noted that such adaptations should not be construed as being limiting of this disclosure. Rather, it should be appreciated that such adaptations may provide flexibility to use a stack of control modules, for instance, the control modules 202, 204, 206 and 208 to form the unitary yet modular manifold 200 that facilitates a sharing of fluid flow between the individual control modules 202, 204, 206 and 208 in turn allowing the individual control modules 202, 204, 206 and 208 of the manifold 200 to support simultaneously the varying load demands of each of the hydraulic actuators 112-122 present on the machine 100.

Further, the body 214 has a first outlet port and a second outlet port 232 that are disposed in selective and independent fluid communication with the spool supply passageway, via the spool chamber, based on a position of the spool within the spool chamber. In some embodiments, the first and second outlet ports 230, 232 may be configured to selectively communicate fluid from the spool supply passageway to a head end chamber and a rod end chamber (not shown) of a hydraulic actuator respectively. In other embodiments, the first and second outlet ports 230, 232 may be configured to selectively communicate fluid from the spool supply passageway to an additional valve assembly (not shown) that is associated with one of the hydraulic actuators. For example, the first and second outlet ports 230, 232 of the control modules 206, 208 may connect with the head end and rod end chambers of the ripper lift actuators 120 and the ripper tilt actuators 122, while the first and second outlet ports 230, 232 of the control modules 202, 204 may connect with a quick drop valve and a regeneration valve (not shown) that are associated with the lift actuators 112, 114 and the tilt actuators 116, 118 of the machine 100 respectively.

The body 214 also has a pair of electrohydraulic spool actuators 234, 236 that are located at a second end 238 of the body 214 and operable to axially displace the spool within the spool chamber. The pair of spool actuators 234, 236 are positioned in parallel and disposed adjacent to one another. In embodiments herein, the pair of spool actuators 234, 236 may be embodied as proportional solenoid control valves. Therefore, for sake of the present disclosure, the spool may be regarded as a proportional directional spring-centered 3-way or 4-way control valve depending upon the specific hardware design of each control module 202, 204, 206, and 208 respectively.

FIG. 3 illustrates a cross-sectional view of a modular hydraulic manifold including five control modules and showing connecting fluid circuits, according to at least one example. As illustrated in the embodiment of FIG. 3, the modular manifold 300 includes five control modules 302, and one pressure relief module 304 that is positioned between the control modules 302 and in fluid communication with the stack of control modules 302. In this embodiment, the two of the individual control modules 302 correspond with both the lift actuators 112, 114 present on the machine 100 while the three control modules 302 correspond to the ripper lift actuators 120, the ripper tilt actuators 122, and the pair of tilt actuators 116, 118 respectively. The configuration of the manifold 300, that is, the two control modules 302 of the manifold 300 in particular, may be implemented for use in controlling one pair of hydraulic actuators i.e., in this case, the lift actuators 112, 114 in scenarios where the machine 100 is of a larger-than-usual size. For example, a large tractor that typically operates with greater fluid delivery demands when compared to conventionally sized tractors.

Further, in this embodiment, bodies of the individual control modules 302 are configured to define the inlet ports, the drain ports, the pilot supply ports, the pilot discharge ports, and the load sensing ports. However, owing to the greater fluid delivery demands when the machine 100 is of a larger-than-usual size machine, the distally located inlet ports from the control modules, may be used provide fluid flow from a pair of pumps (not shown) into the pump supply lines respectively. Further, as shown, the pressure relief module 304 includes a check valve that allows fluid from one of the two pumps i.e., the pump connected via the inlet port to supply the pump supply line, via the pump supply line, with additional flow of fluid when conditions of increased load demands are experienced by the manifold 300.

The manifold 300 defines passageways between the control modules 302 to enable fluid to pass between the modules in use. The passageways 306 and 310 between the modules enable flexibility and are aligned with spool chambers 308 of the control modules. In this manner, the fluid may move directly from spool chamber through the openings to adjacent modules. The alignment results in decreased heat generation for each of the modules due to the reduced number of turns and enlarged openings that are possible due to the openings being directly coupled to the spool chamber 308 rather than through a passageway first.

Figure 4:
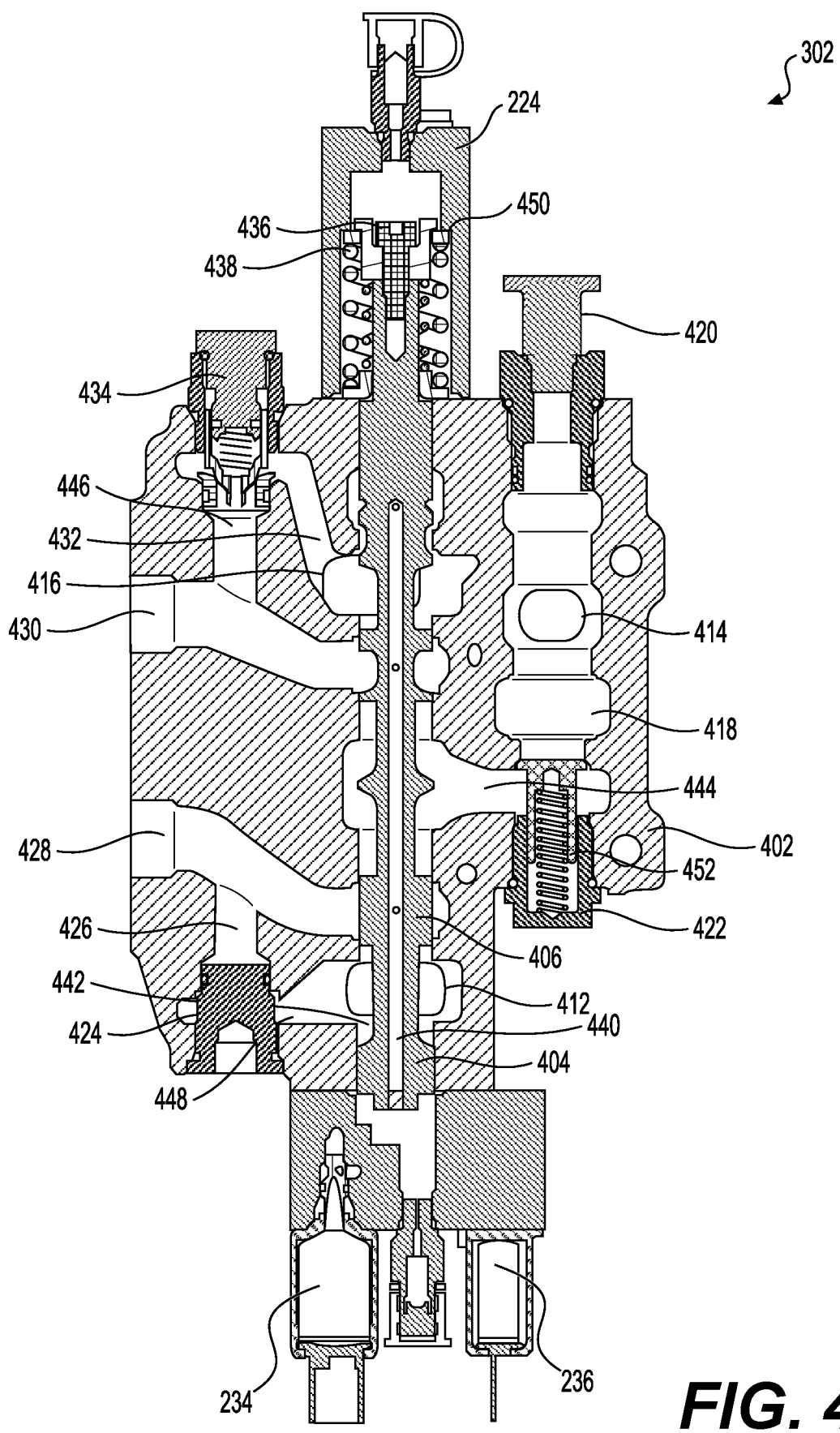
FIG. 4 illustrates a cross-sectional view of a control module for a modular hydraulic manifold, according to at least one example.

FIG. 4 illustrates a cross-sectional view of a control module for a modular hydraulic manifold, according to at least one example. FIG. 4 depicts a cross-sectional view of the modular manifold 300, and in particular of the control module, as taken along the sectional plane AA' of FIG. 2 depicts a schematic of the modular manifold 300.

As shown in FIG. 4, the body 402 has a spool chamber 442 and a load sensing passageway 440 associated with the spool chamber 442. The body 402 also has a spool 406 positioned axially, and at least partially, within the spool chamber 442. The spool 406 is spring-biased by an end cap 224 located at a first end of the body 402. Further, in an embodiment as shown, a stroke i.e., a travel distance of the spool 406 may be defined by one or more stop members, for example, two stop members that are exemplarily shown positioned within the end cap 408. Furthermore, as shown in this embodiment, a spring 438 is located within the end cap 408 and positioned for biasing the spool 406 away from the end cap 408. The threaded end 436 of the spool where the retainer is attached serves as a stop member by interacting with the end cap 224. At the opposite end of the spool, the housing for spool actuators 234 and 236 serve as the stop members for movement in that direction of the spool. In some examples, such as without a float in the hydraulic actuator, the retainer 450 may serve as a stop for the spool as there would be two pieces each located on opposite sides of the spring 438.

The body 402 also has an inlet chamber 418 that is located parallel to the spool 406 and disposed in selective fluid communication with the spool 406 via a spool supply passageway 444. The inlet chamber 418 of the body 402 defines an inlet port 414, and has a pressure compensating hydrostat and a relief valve 420 (which may be a solid plug if the system does not use a hydrostat. The hydrostat, not shown, may be implemented by way of a screw-in cartridge type valve assembly, or a slip-in cartridge type valve assembly, or as a valve member within the spool chamber instead of the cartridge The hydrostat has a valve member that is moveably positioned between a flow blocking position and a flow permitting position to fluid at the inlet chamber 418 by a fluid pressure differential between the spool supply passageway 444 and the load sensing passageway 440.

The valve member 422 is biased by a first spring that is located between one end of the valve member 452 and a second end of the valve member 422 disposed at an end port of the inlet chamber 418. The relief valve 420 is axially biased towards a second end of the inlet chamber 418 and is located on a second plug located at another end port of the inlet chamber 418. As shown, the other end port of the inlet chamber 418 is disposed in a direction opposite to the end port of the inlet chamber 418. The load check valve comprises the valve member 452 disposed within the housing.

Further, the body 402 has a first outlet port 428 and a second outlet port 430 that are disposed in selective and independent fluid communication with the spool supply passageway 444, via the spool chamber 442, based on a position of the spool 406 within the spool chamber 442. In some embodiments, the first and second outlet ports 428, 430 may be configured to selectively communicate fluid from the spool supply passageway 444 to a head end chamber and a rod end chamber (not shown) of a hydraulic actuator respectively. In other embodiments, the first and second outlet ports 428, 430 may be configured to selectively communicate fluid from the spool supply passageway to an additional valve assembly (not shown) that is associated with one of the hydraulic actuators. For example, the first and second outlet ports 428, 430 of the control modules may connect with the head end and rod end chambers of the ripper lift actuators 120 and the ripper tilt actuators 122, while the first and second outlet ports 428, 430 of the control modules may connect with a quick drop valve and a regeneration valve (not shown) that are associated with the lift actuators 112, 114 and the tilt actuators 116, 118 of the machine 100 respectively.

The body 402 also has a pair of electrohydraulic spool actuators 234, 236 that are located at a second end of the body 402 and operable to axially displace the spool 406 within the spool chamber 442. The pair of spool actuators 234, 236 are positioned in parallel and disposed adjacent to one another. In embodiments herein, the pair of spool actuators 234, 236 may be embodied as proportional solenoid control valves. Therefore, for sake of the present disclosure, the spool 406 may be regarded as a proportional directional spring-centered 3-way or 4-way control valve depending upon the specific hardware design of each control module 202, 204, 206, and 208 respectively. For instance, as shown in FIG. 4, the spool 406 used in the control module 302 is embodied as a 4-way directional control valve while the spool 406 is used in respective ones of the control modules may embody the 3-way directional control valve. Although the spool 406 associated with the bodies of the control modules is disclosed herein as a 3-way or 4-way directional control valve, persons skilled in the art can contemplate implementing other configurations of the spool 406 depending on one or more fluid delivery requirements that are associated with each hydraulic actuator 112-122 of the machine 100.

Further, in embodiments herein, the hydrostat may be a slip-in type cartridge valve assembly that may be readily available for installation within the body 402 of the control module as shown in the view of FIG. 4. Although a slip-in type cartridge type valve assembly is disclosed herein, it may be noted that a manner of installation for the pressure compensating hydrostat within the inlet chamber 418 of the body 402 of the control module is exemplary in nature and hence, should not be construed as being limiting of this disclosure. Other types of valve assemblies such as a screw-in type cartridge valve assembly may be used to implement the hydrostat in lieu of the slip-in type cartridge valve assembly disclosed herein.

The body 402 also has a first port 426 in fluid communication with the first outlet port 428 via a first passageway, and a second port 434 in fluid communication with the second outlet port 430 via a second passageway 446. Further, the first port 428 is in selective fluid communication with the spool 406 via a third passageway 448, and the second port 434 is in selective fluid communication with the spool 406 via a fourth passageway 432. Also, in embodiments herein, the load sensing passageway 440 may be disposed in selective and independent fluid communication with one of the third and fourth passageways. The load sensing passageway 440 may be configured to enable fluid communication that enables fluid pressure to communicate as a fluid pressure signal through the load sensing passageway 440.

In embodiments herein, each control module 202, 204, 206, and 208 may further include at least one of a first check valve, a first pilot-operated relief valve, and a third plug disposed in the first port of the body 402. For example, the first check valve may be disposed in the first port 428 of each of the control modules and the third plug may be disposed in the first port 428 of the control module, and the first pilot-operated relief valve may be disposed in the first port 428 of the control module. Further, in embodiments herein, each control module 202, 204, 206, and 208 may also include one of a second check valve and a fourth plug disposed in the second ports of the bodies from corresponding ones of the control modules respectively.

The body 402 includes inlet ports 412, 414, and 416 for communication between adjacent modules of the modular manifold. The openings may pass directly into the inlet chamber 418 and the spool chamber 442. The openings for the inlet ports 412 and 416 may each define a respective open area to provide fluid communication to an adjacent control module, the respective open area having a cross-sectional area of greater than 550 square millimeters.

The float within the control module may be moved anywhere along the stem line as a result of the movement of openings to be aligned with the spool chamber 442. The float being movable provides flexibility for integration by enabling implementation in a greater number of configurations, thereby enabling the system to accommodate additional hydraulic systems of varying complexity. In some examples, the control module where the spool chamber may include a float chamber, the float chamber positioned at an intersection between a connection from the inlet chamber to the spool chamber. The spool may include a movable float, the movable float positionable along a length of the spool.

Figure 5:
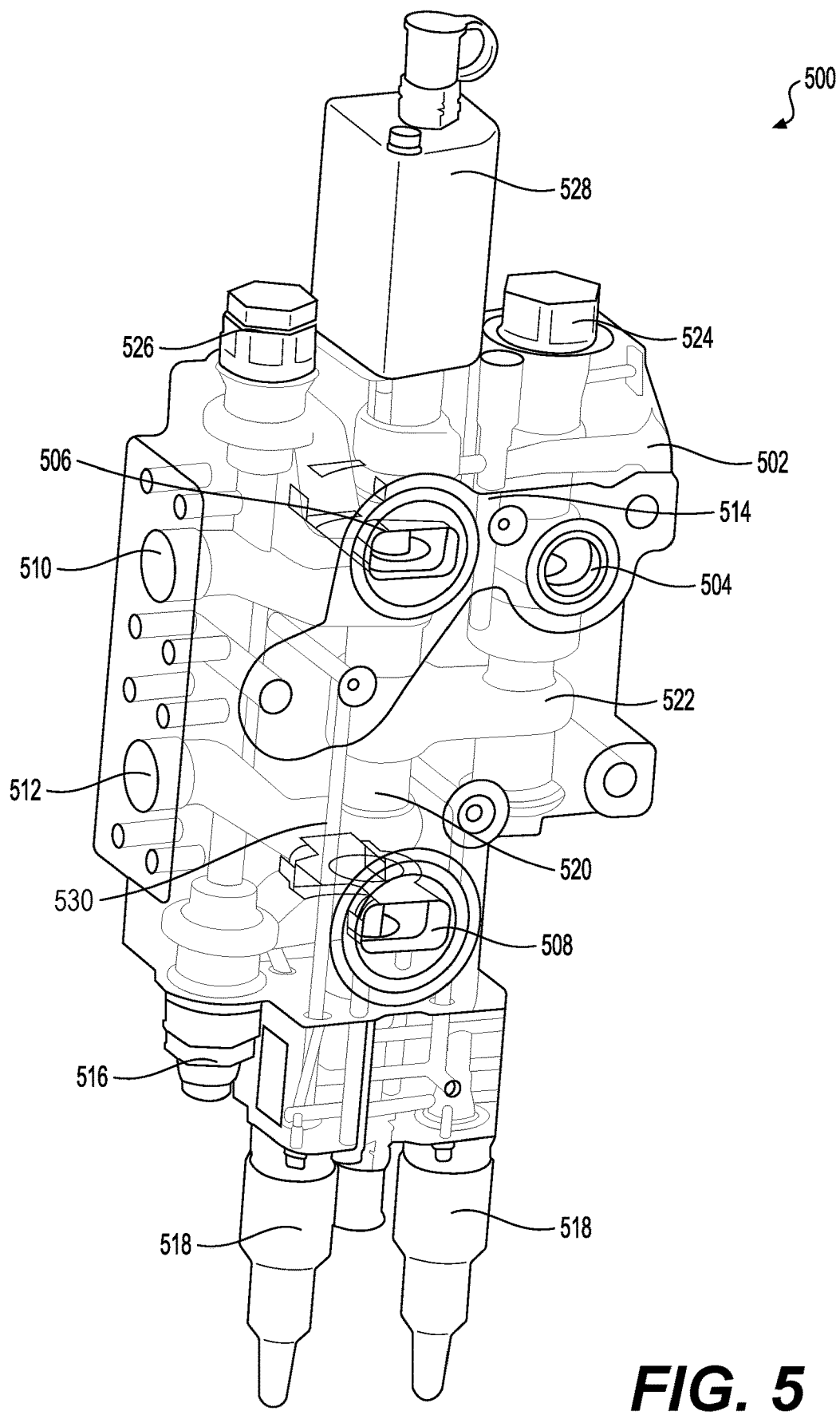
FIG. 5 illustrates a first perspective view of a control module showing external ports and internal channels for hydraulic fluid, according to at least one example.

FIG. 5 illustrates a first perspective view of a control module 500 showing external ports and internal channels for hydraulic fluid, according to at least one example. The control module 500 includes a body 502, inlet port 504, first port 506, second port 508, opening 510 and opening 512 for enabling hydraulic fluid to circulate through the system. The inlet passage 522 from the inlet chamber to the spool chamber 520 enables hydraulic fluid to move within the control module 500. The control module 500 further includes valves 516, 524, 526, and 528 serving as check valves. The control module 500 also includes actuation mechanisms 518 as described herein.

The control module 500 further includes a load sensing line 514 that is in selective fluid communication with the load sensing passageway via a bi-directional pilot-operated shuttle valve. Moreover, as shown, the load sensing line 514 associated with the spool 406 is also fluidly coupled to the hydrostat i.e., the two-position pilot operated inlet valve. Therefore, in embodiments herein, the load pressure signal is provided by the load sensing passageway to the pump, via the shuttle valve and the load sensing line, and the hydrostat for varying a pump displacement, and for varying the flow rate of fluid from the inlet valve into the inlet chamber of the control modules respectively.

INDUSTRIAL APPLICABILITY

The present disclosure provides systems and methods for a modular hydraulic control manifold that may have a flexible number of control modules added thereto. Such systems and methods may be used to achieve better performance and longer life of hydraulic fluid by reducing excess heat introduced to the hydraulic oil that would otherwise result in the hydraulic oil breaking down prematurely. Accordingly, the modular manifold may have a body with a larger heat capacity than a conventional manifold and therefore be capable of absorbing additional heat from the system. Additionally, such systems and methods may be used to improve inefficiencies in machine operations. As noted herein, the machine operations may be improved by providing a high flow capacity through the control modules as openings are larger than in conventional manifold design as well as having decreased passageway constrictions. In this manner, the machine may be kept running with as little downtime as possible, for example to replace or repair hydraulic components and fluid, thereby increasing worksite efficiency.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A control module for a hydraulic actuator, the control module comprising:
    a body having a length, a width, and a height including:
        a spool chamber extending at least partially along the length of the body along a first axis and coupled to a spring at a first end of the body;
        a load sensing passage associated with the spool chamber and extending at least partially along the length of the body parallel with the first axis;
        a first outlet port on a first surface of the body in selective fluid communication with the spool chamber;
        a second outlet port on the first surface of the body in selective fluid communication with the spool chamber;
        an inlet chamber positioned parallel with the spool chamber and in fluid communication with the spool chamber via a spool supply passage;
        a first side port on a second surface of the body, the first side port in fluid communication with the spool chamber and disposed along the first axis of the spool chamber, wherein the second surface is perpendicular to the first surface;
        a second side port on the second surface of the body, the second side port in fluid communication with the spool chamber and disposed along the first axis of the spool chamber;
        a third side port on a third surface of the body, the third side port in fluid communication with the spool chamber and disposed along the first axis of the spool chamber, wherein the third surface is perpendicular with the first surface and parallel with the second surface; and
        a fourth side port on the third surface of the body, the fourth side port in fluid communication with the spool chamber and disposed along the first axis of the spool chamber;
    a spool positioned axially within the spool chamber; and
    a pair of spool actuators located at a second end of the body, the spool actuators are operable to displace the spool within the spool chamber.

2. The control module of claim 1, wherein the spool chamber comprises a float chamber, the float chamber positioned at an intersection between a connection from the inlet chamber to the spool chamber.

3. The control module of claim 2, wherein the spool comprises a movable float, the movable float positionable along a length of the spool.

4. The control module of claim 1, further comprising a control signal channel within the body parallel with and offset from the spool chamber, wherein the control signal channel comprises a first angled hole from the control signal channel to the spool chamber at a first location and a second angled hole from the control signal channel to the spool chamber at a second location.

5. The control module of claim 1, wherein the body comprises an iron casting having a weight of greater than 12.5 kilograms.

6. The control module of claim 1, wherein the first side port, second side port, third side port, and fourth side port each define a respective open area to provide fluid communication to an adjacent control module, the respective open area having a cross-sectional area of greater than 550 square millimeters.

7. The control module of claim 1, further comprising a signal port fluidly coupling the inlet chamber and the spool chamber, the signal port being disposed at a non-perpendicular angle relative to the first axis.

8. The control module of claim 1, further comprising a first relief valve in fluid communication with the first side port and the first outlet; and
a second relief valve in fluid communication with the second side port and the second outlet.

9. A modular manifold for control of hydraulic actuators, the manifold comprising:
at least two control modules corresponding to at least two hydraulic actuators, wherein the at least two control modules are adjacently located and coupled to one another in fluid communication, wherein each control module of the at least two control modules comprises:
a body including:
a spool chamber extending at least partially along a length of the body along a first axis and coupled to a spring at a first end of the body;
a load sensing passage associated with the spool chamber and extending at least partially along the length of the body parallel with the first axis;
a first outlet port on a first surface of the body in selective fluid communication with the spool chamber;
a second outlet port on the first surface of the body in selective fluid communication with the spool chamber;
an inlet chamber positioned parallel with the spool chamber and in fluid communication with the spool chamber via a spool supply passage;
a first side port on a second surface of the body, the first side port in fluid communication with the spool chamber and disposed along the first axis of the spool chamber, wherein the second surface is perpendicular to the first surface;
a second side port on the second surface of the body, the second side port in fluid communication with the spool chamber and disposed along the first axis of the spool chamber;
a third side port on a third surface of the body, the third side port in fluid communication with the spool chamber and disposed along the first axis of the spool chamber, wherein the third surface is perpendicular with the first surface and parallel with the second surface; and
a fourth side port on the third surface of the body, the fourth side port in fluid communication with the spool chamber and disposed along the first axis of the spool chamber.

10. The modular manifold of claim 9, wherein the spool chamber comprises a float chamber, the float chamber positioned at an intersection between a connection from the inlet chamber to the spool chamber.

11. The modular manifold of claim 10, further comprising a spool within the spool chamber wherein the spool comprises a movable float, the movable float positionable along a length of the spool.

12. The modular manifold of claim 9, further comprising a control signal channel within the body parallel with and offset from the spool chamber, wherein the control signal channel comprises a first angled hole from the control signal channel to the spool chamber at a first location and a second angled hole from the control signal channel to the spool chamber at a second location.

13. The modular manifold of claim 9, wherein the body comprises an iron casting having a weight of greater than 12.5 kilograms.

14. The modular manifold of claim 9, wherein the first side port, second side port, third side port, and fourth side port each define a respective open area to provide fluid communication to an adjacent control module, the respective open area having a cross-sectional area of greater than 550 square millimeters.

15. The modular manifold of claim 9, further comprising a signal port fluidly coupling the inlet chamber and the spool chamber, the signal port being disposed at a non-perpendicular angle relative to the first axis.

16. The modular manifold of claim 9, further comprising a first relief valve in fluid communication with the first side port and the first outlet; and
a second relief valve in fluid communication with the second side port and the second outlet.

17. A body for a modular hydraulic manifold comprising:
a spool chamber extending at least partially along a length of the body along a first axis and coupled to a spring at a first end of the body;
a load sensing passage associated with the spool chamber and extending at least partially along the length of the body parallel with the first axis;
a first outlet port on a first surface of the body in selective fluid communication with the spool chamber;
a second outlet port on the first surface of the body in selective fluid communication with the spool chamber;
an inlet chamber positioned parallel with the spool chamber and in fluid communication with the spool chamber via a spool supply passage;
a first side port on a second surface of the body, the first side port in fluid communication with the spool chamber and disposed along the first axis of the spool chamber, wherein the second surface is perpendicular to the first surface;
a second side port on the second surface of the body, the second side port in fluid communication with the spool chamber and disposed along the first axis of the spool chamber;
a third side port on a third surface of the body, the third side port in fluid communication with the spool chamber and disposed along the first axis of the spool chamber, wherein the third surface is perpendicular with the first surface and parallel with the second surface; and
a fourth side port on the third surface of the body, the fourth side port in fluid communication with the spool chamber and disposed along the first axis of the spool chamber.

18. The body of claim 17, wherein the spool chamber comprises a float chamber, the float chamber positioned at an intersection between a connection from the inlet chamber to the spool chamber; and wherein the spool comprises a movable float, the movable float positionable along a length of the spool.

19. The body of claim 17, further comprising a control signal channel within the body parallel with and offset from the spool chamber, wherein the control signal channel comprises a first angled hole from the control signal channel to the spool chamber at a first location and a second angled hole from the control signal channel to the spool chamber at a second location.

20. The body of claim 17, wherein the first side port, second side port, third side port, and fourth side port each define a respective open area to provide fluid communication to an adjacent control module, the respective open area having a cross-sectional area of greater than 550 square millimeters.

\* \* \* \* \*